United States Patent
Smith et al.

(10) Patent No.: US 8,515,565 B2
(45) Date of Patent: Aug. 20, 2013

(54) METHOD AND SYSTEM FOR AN INTEGRATED INCIDENT INFORMATION AND INTELLIGENCE SYSTEM

(75) Inventors: Cyrus W. Smith, Marietta, GA (US); Allan R. Metts, Duluth, GA (US)

(73) Assignee: Airsage, Inc., Atlanta, GA (US)

( * ) Notice: Subject to any disclaimer, the term of this patent is extended or adjusted under 35 U.S.C. 154(b) by 1226 days.

(21) Appl. No.: 11/406,722

(22) Filed: Apr. 19, 2006

(65) Prior Publication Data
US 2006/0235833 A1    Oct. 19, 2006

Related U.S. Application Data

(60) Provisional application No. 60/672,701, filed on Apr. 19, 2005.

(51) Int. Cl.
*G06F 19/00*     (2011.01)

(52) U.S. Cl.
USPC .............................. 700/90; 700/216; 455/17

(58) Field of Classification Search
USPC ............... 700/90, 216, 232, 236, 219; 701/1, 701/36, 200–204, 207–208, 213; 705/1, 705/17–18, 25–29; 445/401, 401.1; 455/401, 455/401.1; 709/224, 217, 219
See application file for complete search history.

(56) References Cited

U.S. PATENT DOCUMENTS

| | | | |
|---|---|---|---|
| 4,224,669 A * | 9/1980 | Brame | 701/8 |
| 5,541,590 A * | 7/1996 | Nishio | 340/903 |
| 6,117,073 A | 9/2000 | Jones et al. | |
| 6,167,448 A * | 12/2000 | Hemphill et al. | 709/224 |
| 6,473,659 B1 * | 10/2002 | Shah et al. | 700/79 |
| 6,496,110 B2 | 12/2002 | Peterson et al. | |
| 6,594,634 B1 * | 7/2003 | Hampton et al. | 705/3 |
| 6,690,294 B1 * | 2/2004 | Zierden | 340/937 |
| 6,842,620 B2 * | 1/2005 | Smith et al. | 455/456.1 |
| 6,871,137 B2 * | 3/2005 | Scaer et al. | 701/200 |
| 6,907,237 B1 * | 6/2005 | Dorenbosch et al. | 455/404.1 |
| 7,024,370 B2 * | 4/2006 | Epler et al. | 705/3 |
| 7,343,302 B2 * | 3/2008 | Aratow et al. | 705/325 |
| 7,630,948 B2 * | 12/2009 | Friedlander et al. | 706/47 |
| 7,725,565 B2 * | 5/2010 | Li et al. | 709/219 |
| 7,930,681 B2 * | 4/2011 | Kloeffer et al. | 717/120 |
| 2002/0160745 A1 * | 10/2002 | Wang | 455/404 |
| 2003/0093580 A1 * | 5/2003 | Thomas et al. | 709/318 |
| 2003/0195775 A1 | 10/2003 | Hampton et al. | |
| 2004/0125206 A1 * | 7/2004 | Lohmann | 348/155 |
| 2004/0250133 A1 * | 12/2004 | Lim | 713/201 |
| 2005/0096842 A1 * | 5/2005 | Tashiro | 701/210 |
| 2005/0192033 A1 * | 9/2005 | Videtich | 455/456.6 |
| 2007/0275690 A1 * | 11/2007 | Hunter et al. | 455/404.2 |

OTHER PUBLICATIONS

International Search Report, PCT/US2006/014620, Oct. 17, 2007.

* cited by examiner

*Primary Examiner* — Kidest Bahta
(74) *Attorney, Agent, or Firm* — King & Spalding

(57) ABSTRACT

Providing a system and method for identifying and characterizing incidents. The system and method can receive information from telecommunications networks or other information providers that may trigger generating an Incident Record. The Incident Record may further be analyzed to characterize the type of incident. This further analysis may include retrieving data from multiple data sources to support the application of rules used to characterize the incident. Additionally, analyses from multiple incidents may be combined if determined to relate to a single event.

10 Claims, 10 Drawing Sheets

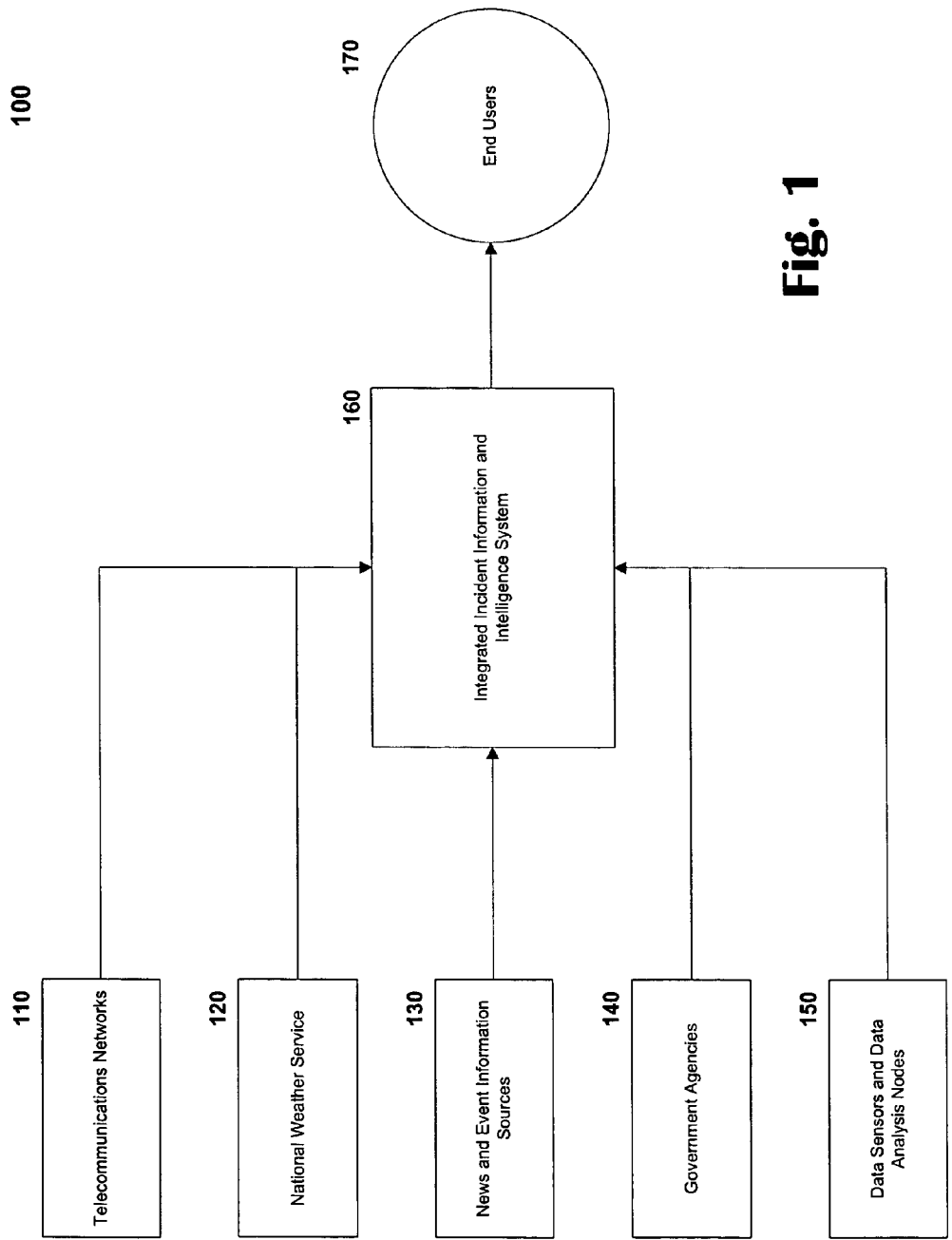

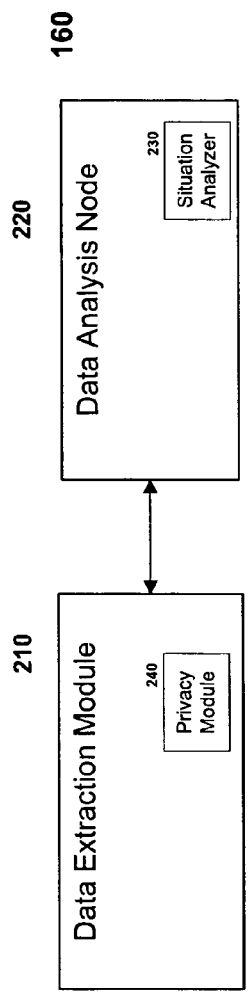
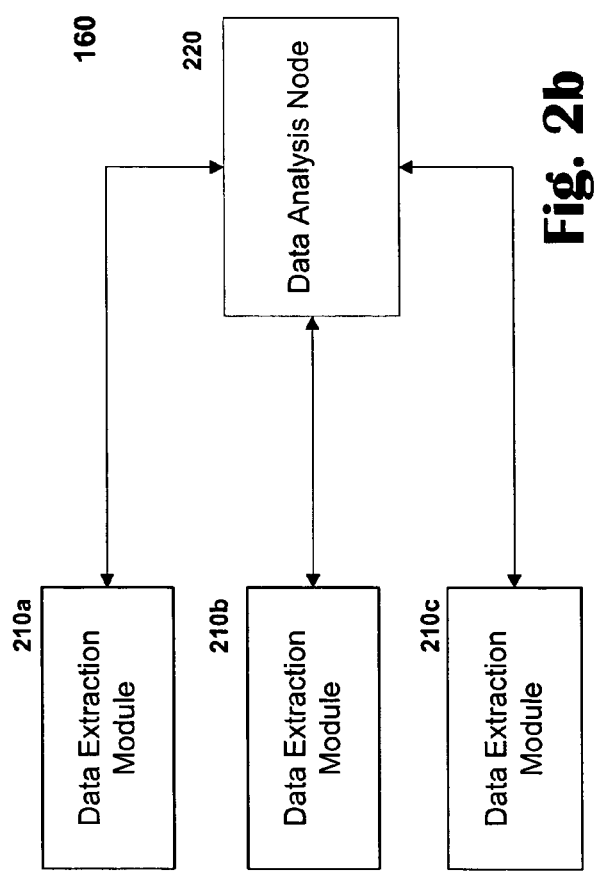
Fig. 2a
Fig. 2b

METHOD AND SYSTEM FOR AN INTEGRATED INCIDENT INFORMATION AND INTELLIGENCE SYSTEM

STATEMENT OF RELATED PATENT APPLICATIONS

This non-provisional patent application claims priority under 35 U.S.C. §119 to U.S. Provisional Patent Application No. 60/672,701, titled Method and System for an Integrated Incident Information and Intelligence System, filed Apr. 19, 2005. This provisional application is hereby fully incorporated herein by reference.

FIELD OF THE INVENTION

This invention relates to a system and method for integrating incident information and intelligence. More particularly, this invention relates to evaluating information from telecommunications systems or other information sources indicating that an incident may have occurred and characterizing the possible incident.

BACKGROUND OF THE INVENTION

In 1967, the President's Commission on Law Enforcement and Administration of Justice recommended that a single nationwide number be established for reporting emergency situations. Overwhelming support for the concept prompted AT&T, the nation's predominate telecommunications company at that time, to establish the three-digit number 911 as the emergency code throughout the United States.

Today, nearly every area of North America is covered by basic or enhanced 911 service from landline, also referred to as "wireline," telecommunications networks. Basic 911 means that when the number is dialed, a call taker in the local public safety answering point (PSAP), or 911 center, answers the call. The caller can communicate the nature and location of the emergency to the call taker who can then take action as appropriate to dispatch emergency service personnel to the scene. With enhanced 911 (E911), the local 911 center has information and technology that allows the call taker to see the caller's phone number and address on a display. This enhancement enables the center to more quickly dispatch emergency help, even if the caller is unable to communicate where they are or the nature of the emergency.

As wireless communications became more popular, the capabilities of E911, primarily the automated number and location identification (ANI and ALI) capabilities, were extended to wireless callers to enhance public safety. As part of this extension, the laws and technology are now largely in place to enable wireless service providers to locate a mobile device to within 100 meters.

When a 911 call is made, the telecommunications switch, whether wireline or wireless, must know which PSAP should receive the call. This determination is made based on the location of the caller. From a wireline phone, the location is simply determined by using a look-up table that associates the calling number with an address. For a wireless caller, locating the call is more complex. The wireless service provider may use global positioning technology, which is sometimes a part of the phone, or the service provider may use some type of signaling analysis to help pinpoint the location of the caller. The location process may be further complicated if the call is made from a phone that is moving.

While E911 has greatly enhanced the ability for emergency response teams to coordinate and react to emergency situations, the system provides many opportunities for improvements. For example, with more than 4,400 PSAPs nationwide, technical as well as institutional challenges often make it difficult to share information about incidents that span multiple jurisdictions or even among multiple disciplines within the same jurisdiction. Most PSAPs and response organizations have independent software systems or policies that often makes a coordinated response more difficult. Similarly, situations that routinely span multiple jurisdictions, such as "Amber Alerts" and evacuation management could be better served by an integrated incident analysis and response system.

In addition to 911 systems, other systems are in place that provide indications of emergency or other incidents. These systems may include static sensors, such as traffic sensors; weather alert systems; or industrial accident warning systems. These systems can be integrated with 911 and other systems to provide an integrated incident analysis system.

In view of the foregoing, there is a need for a system and method that integrates incident information and intelligence by identifying, analyzing, and characterizing incidents.

SUMMARY OF THE INVENTION

The present invention provides a system and method that integrates incident information and intelligence by identifying, analyzing, and characterizing incidents.

In one aspect of the invention, a system for providing integrated information and intelligence is disclosed. This system includes a data extraction module, logically coupled to one or more information sources, operable to receive information from the one or more information sources and further operable to generate an incident record, wherein the incident record comprises information received from the one or more information sources; and a data analysis module, logically coupled to the data extraction module, operable to apply one or more event rules to characterize an incident event in response to processing the incident record.

In another aspect of the present invention, a method for providing integrated information and intelligence is disclosed. The method includes the steps of 1) receiving information from one or more information sources; 2) generating an incident record from the received information; and 3) analyzing the incident record to characterize the incident based on one or more event rules.

The aspects of the present invention may be more clearly understood and appreciated from a review of the following detailed description of the disclosed embodiments and by reference to the drawings and claims.

BRIEF DESCRIPTION OF THE DRAWINGS

FIG. 1 depicts an operating environment of an exemplary embodiment of the present invention.

FIG. 2a presents a block diagram showing components of the Integrated Incident Information and Intelligence System of an exemplary embodiment of the present invention.

FIG. 2b presents a block diagram showing components of the Integrated Incident Information and Intelligence System of an alternative exemplary embodiment of the present invention.

DETAILED DESCRIPTION OF THE EXEMPLARY EMBODIMENTS

Figure 2C:
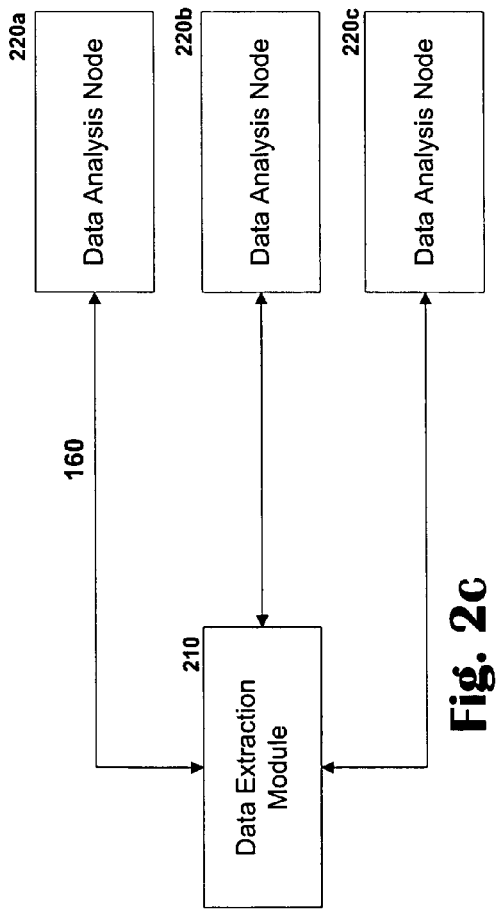
FIG. 2c presents a block diagram showing components of the Integrated Incident Information and Intelligence System of an alternative exemplary embodiment of the present invention.

Exemplary embodiments of the present invention provide a system and method for integrating incident information and intelligence by identifying, analyzing, and characterizing incidents.

FIG. 1 depicts an operating environment 100 of an exemplary embodiment of the present invention. Referring to FIG. 1, an Integrated Incident Information and Intelligence System 160 connects to multiple information sources. These multiple information sources include telecommunications networks 110, a National Weather Service 120, News and Event Information 130, Government Agencies 140, and Data Sensors and Data Analysis Nodes 150. These information sources may provide information to the Integrated Incident Information and Intelligence System 160 that triggers an incident detection and/or they may provide information to support the analysis of a detected incident, such as a 911 call. The Integrated Incident Information and Intelligence System 160 also connects to end users 170, who use the results of an incident analysis performed by the Integrated Incident Information and Intelligence System 160.

The Telecommunications Networks 110 may include wireline and wireless telephony systems. Additionally, the telecommunications networks 110 may include private or specialized telephony systems, such as dedicated telephony systems used by private or government facilities. Also, the wireless telephony systems may include multiple wireless carriers supporting a single area. One skilled in the art would appreciate that any type of telecommunications network could provide information to the Integrated Incident Information and Intelligence System 160.

The Telecommunications Networks 110 may provide incident information to the Integrated Incident Information and Intelligence System 160. At least two forms of incident detection may be performed by the Integrated Incident Information and Intelligence System 160 based on information from telecommunications networks 110. The first form relates primarily to wireless telephony networks and involves the processing of event data relating to many types of subscriber, that is, wireless telephony user, events in the network. These events may include call initiation, call termination, handoffs from one cell to another, and mobile station registrations.

This event data is collected for all events in a given region, whether or not the subscribers use the 911 (or other) emergency services. If subscriber movement can be discerned from the event data, such as by determining a subscriber has moved from one cell location to another, the subscriber's movement can be assigned to the most likely road segments that facilitate such travel. U.S. Pat. No. 6,842,620, entitled System and Method for Providing Traffic Information Using Operational Data of a Wireless Network describes one way that the subscriber's movement can be assigned to the most likely road segments. The specification of U.S. Pat. No. 6,842,620 is hereby fully incorporated herein by reference.

By tracking a subscriber's movement along a roadway, subsequent incident detections can be analyzed in view of this movement. In one example, an incident may be triggered by the characterization of the movement of mobile stations operating in the wireless telephony network. To illustrate further, the Integrated Incident Information and Intelligence System 160 may determine that the average speed on a highway suddenly dropped from 60 miles per hour to 10 miles per hour. This change may trigger an incident detection.

As another example, if a subscriber uses the 911 (or other) emergency services, the Integrated Incident Information and Intelligence System 160 may characterize the emergency incident based on that subscriber's location. Emergency 911 calls performed by seemingly non-moving subscribers can provide insights as well, especially if they occur at the same time as those that are moving. In this case, the Integrated Incident Information and Intelligence System 160 may determine that the incident itself is preventing the non-moving subscribers from moving, such as an automobile accident involving those subscribers.

In this form of incident detection, individual 911 calls may be analyzed in order to identify patterns, provide insights, and to filter out "noisy" data that represents 911 calls unrelated to traffic incidents. Emergency 911 calls from mobile stations that are moving may be tallied and reported on a per-road-segment basis over a specific time interval. Emergency 911 calls from mobile stations that are not moving may also be associated with specific road segments. However, since these incidents could very well be unrelated to traffic, they may be tallied and reported separately from those that incidents initiated by moving mobile stations. Additionally, the Integrated Incident Information and Intelligence System 160 can correlate calls from both moving and non-moving mobile stations that occur in close proximity to each other in both time and location.

The second form of incident detection is triggered from any emergency 911 call, whether from a wireless or wireline telephony network. An example of how emergency 911 calls from a wireless telephony network may trigger an incident detection was described above. For a wireline call, the Integrated Incident Information and Intelligence System 160 may determine that multiple emergency 911 calls have been made, perhaps involving multiple PSAPs. When the Integrated Incident Information and Intelligence System 160 receives notification of a 911 call, the system may initiate a scan of all other 911 calls within a certain radius and time frame. If the Integrated Incident Information and Intelligence System 160 finds a previous 911 call that matches the given criteria, the call can be categorized with the initial call. The system can be "trained" to look for certain volumes, types, or combinations of 911 calls in order to categorize each case. For example, an incident with five or fewer associated 911 calls from moving vehicles could be classified as a minor traffic incident. An incident with 25 or more 911 calls from mobile stations could be classified as a potentially major traffic incident. An incident with 10 or more 911 calls from both wireless and wireline telephony networks could be classified as a fire or weather event.

The National Weather Service 120 provides weather information to the Integrated Incident Information and Intelligence System 160. This information can be used to trigger an incident detection (such as a weather alert) or to characterize an incident. For example, multiple emergency 911 calls in an area that is under a tornado warning may indicate that a tornado has formed. The National Weather Service 120 may be the service run by the U.S. National Oceanic and Atmospheric Administration or some other weather reporting service, such as localized weather recording facilities. One skilled in the art would appreciate that any type of weather reporting service could provide information to the Integrated Incident Information and Intelligence System 160.

The News and Event Information Sources 130 also provide information to the Integrated Incident Information and Intelligence System 160, information that may trigger an incident detection or further characterize a detected incident. For example, the Integrated Incident Information and Intelligence System 160 may detect an incident based on a traffic abnormality, such as slow moving traffic. The News and Event Information Sources 130 may indicate that a certain event may be ongoing near that location, such as a sporting event or local festival. This information would be used by the Integrated Incident Information and Intelligence System 160 to characterize the incident. Similarly, news reports of a roadway hazard could be used by the Integrated Incident Information and Intelligence System 160 in characterizing the incident. The News and Event Information Sources 130 may include a variety of sources, including new reports, community and school calendars of events, police scanner reports, and road construction information.

Similarly, Government Agencies 140 may provide information to the Integrated Incident Information and Intelligence System 160. For example, a government agency may issue an "Amber Alert." The Amber Alert program was created to provide early and widespread notification that a child has been abducted and may be in danger of serious bodily harm or death. With a description of the child, a vehicle involved, or the suspected abductor, the public can call 911 to notify officials of a sighting. This sighting information when analyzed with anonymous movement information of mobile devices may show one or more mobile devices that track movement patterns similar to those derived by analyzing the sightings. If a statistically significant match is found, movement of the device could continue to be tracked until the child is found or authorities are satisfied that the device movement was coincidental. Other examples may be evacuation orders, emergency readiness drills, or abnormal events at large government facilities.

The Data Sensors and Data Analysis Nodes 150 may also provide information to the Integrated Incident Information and Intelligence System 160. In one example, a community may have a traffic sensor system in place. These sensors may monitor the speed of traffic at certain locations. The Integrated Incident Information and Intelligence System 160 may use this sensor data to trigger an incident detection or further characterize a detected incident, similar to using traffic data developed from mobile station movement information. Other Data Sensors and Data Analysis Nodes 150 may include weather-related sensors, environmental sensors, or components of other incident detection systems. Again, one skilled in the art would appreciate that any type of Data Sensors and Data Analysis Nodes 150 could provide information to the Integrated Incident Information and Intelligence System 160.

The End Users 170 may include news services, local and national governmental agencies, and other, centralized, emergency analysis and response organizations. Additionally, End Users 170 may be the general public, perhaps through an incident reporting service provider. End Users 170 may be linked to the Integrated Incident Information and Intelligence System 160 through a wide-area network, such as the internet; another telecommunications network; a dedicated connection; or the system may reside at the End User's 170 location. A single Integrated Incident Information and Intelligence System 160 can support multiple End Users 170. One skilled in the art would appreciate that certain organizations can be both information sources, such as Governmental Agencies 140, and End Users 170.

FIG. 2a presents a block diagram showing components of the Integrated Incident Information and Intelligence System 160 of an exemplary embodiment of the present invention. Referring to FIGS. 1 and 2a, the Integrated Incident Information and Intelligence System 160 includes a Data Extraction Module 210 and a Data Analysis Node 220. The Data Extraction Module 210 and the Data Analysis Node 220 include computer hardware and associated software. The Data Extraction Module 210 and the Data Analysis Node 220 are connected such that they can convey data or instructions to one another. The Data Extraction Module 210 includes a Privacy Module 240 and the Data Analysis Node 220 may include a Situation Analyzer 230. The functions of the Situation Analyzer 230 and the Privacy Module 240 are discussed in greater detail below, in conjunction with FIGS. 8 and 9, respectively. One skilled in the art would appreciate that the Data Extraction Module 210 and the Data Analysis Node 220 may be co-located on same computer system or at the same facility or located in separate facilities. Similarly, one skilled in the art would appreciate that either the Data Extraction Module 210 or the Data Analysis Node 220 individually may operate on one computer system or on multiple computer systems at the same facility or located in separate facilities.

The exemplary Data Extraction Module 210 and the Data Analysis Node 220 provide two general functions. The Data Extraction Module 210 interfaces with information sources to receive information from those sources. This receipt of information may be continuous, in the sense that the information source supplies information to the Data Extraction Module 210 at regular intervals or as available. This receipt may be initiated by the information source, which may push the information to the Data Extraction Module 210. Other information my be received by the Data Extraction Module 210 based on requests from the Data Extraction Module 210 to the information source.

The Data Analysis Node 220 processes the information received by the Data Extraction Module 210. This processing applies rules to the received information to characterize this information. This characterization may trigger additional information needs, such that the Data Analysis Node 220 requests the information from specific information sources through the Data Extraction Module 210.

Figure 2D:
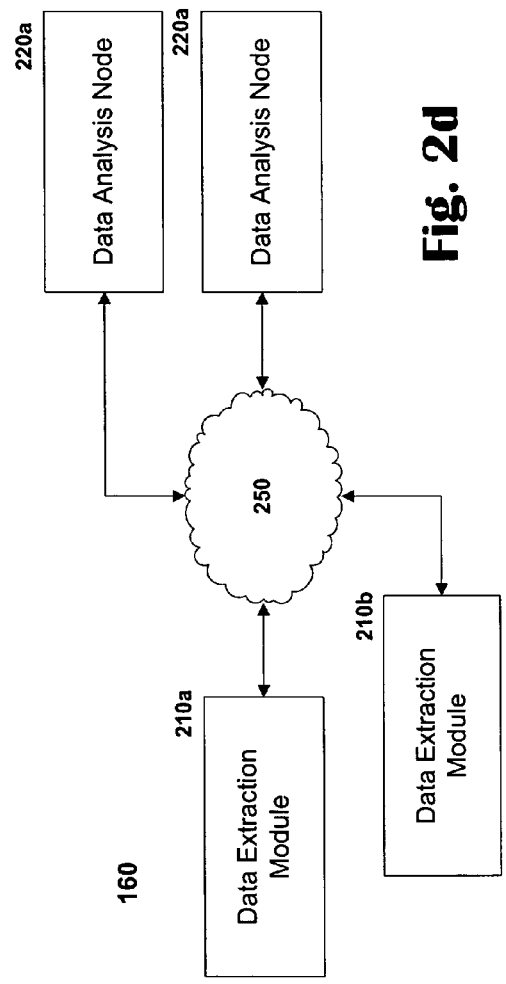
FIG. 2d presents a block diagram showing components of the Integrated Incident Information and Intelligence System of an alternative exemplary embodiment of the present invention.

FIG. 2b presents a block diagram showing components of the Integrated Incident Information and Intelligence System of an alternative exemplary embodiment of the present invention. Referring to FIGS. 2a and 2b, the Data Extraction Module 210 may actually be multiple Data Extraction Modules 210a, 210b, 210c, all of which are operably connected to a single Data Analysis Node 220. Similarly, referring to FIGS. 2a and 2c, the Data Analysis Node 220 may actually be multiple Data Analysis Nodes 220a, 220b, 220c, all of which are operably connected to a single Data Extraction Module 210. Finally, referring to FIGS. 2a and 2d, one or more Data Extraction Modules 210a . . . 210n may be connected to one or more Data Analysis Nodes 220a . . . 220n. These components may be connected over a local area or wide area network 250, such as the Internet. One skilled in the art would appreciate that the division of the Data Extraction Module 210 and the Data Analysis Node 220 is a matter of design choice and convenience and that the functions of the present invention could be performed using a single computer system and software program. One skilled in the art would also appreciate that any Data Extraction Module may include a Privacy Module 240 and any Data Analysis Node may include a Situation Analyzer 230.

Figure 3:
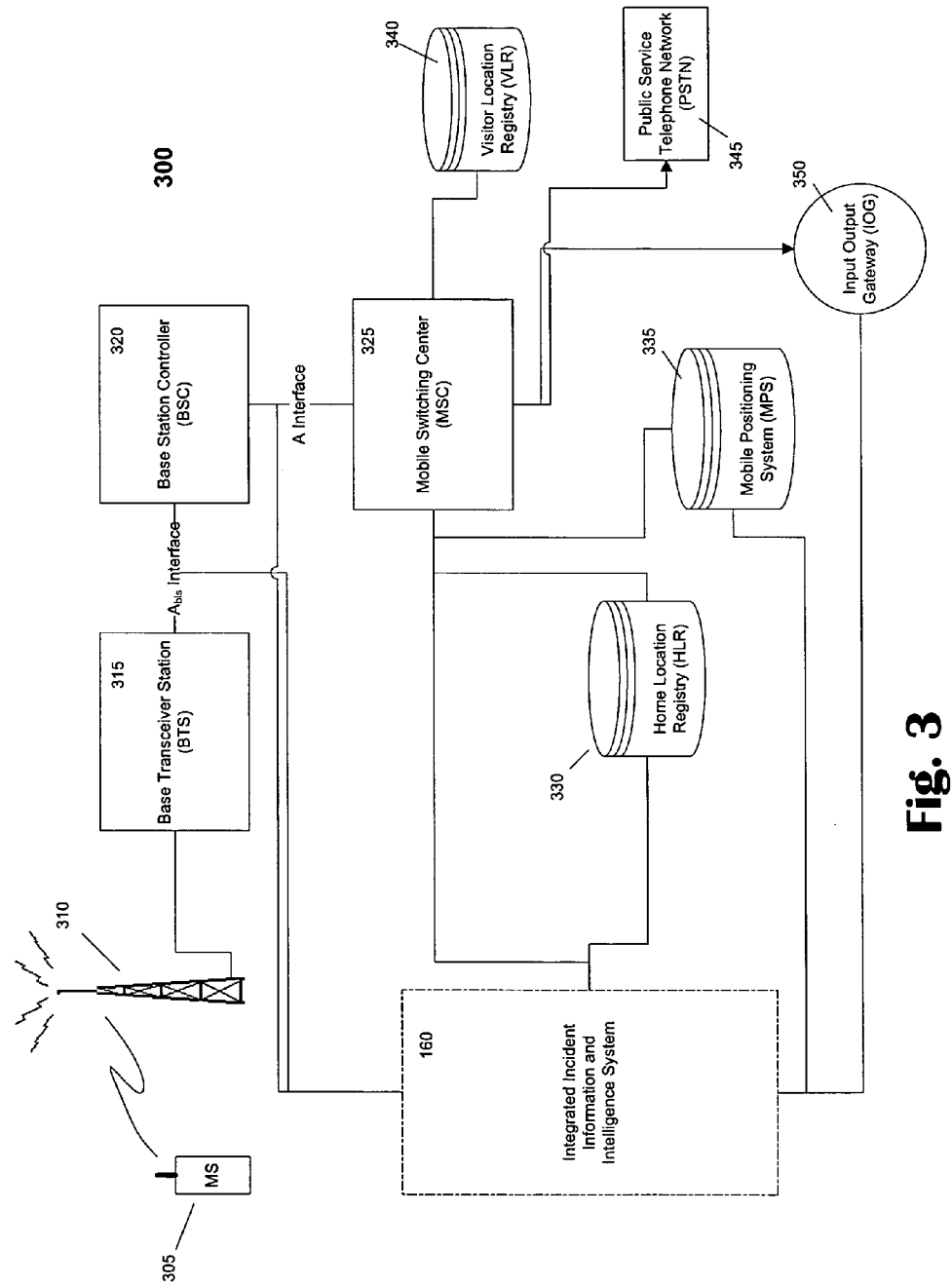
FIG. 3 depicts a wireless telephony component of an operating environment of an exemplary embodiment of the present invention.

FIG. 3 depicts a wireless telephony component 300 of an operating environment of an exemplary embodiment of the present invention. Referring to FIG. 3, mobile station (MS) 305 transmits signals to and receives signals from the radiofrequency transmission tower 310 while within a geographic cell covered by the tower. These cells vary in size based on anticipated signal volume. A Base Transceiver System (BTS) 315 is used to provide service to mobile subscribers within its cell. Several Base Transceiver Systems are combined and controlled by a Base Station Controller (BSC) 320 through a connection called the $A_{bis}$ Interface. The Integrated Incident Information and Intelligence System 160 can interface with the $A_{bis}$ Interface line. A Mobile Switching Center (MSC) 325 does the complex task of coordinating all the Base Station Controllers, through the A Interface connection, keeping track of all active mobile subscribers using the Visitor Location Register (VLR) 340, maintaining the home subscriber records using the Home Location Register (HLR) 330, and connecting the mobile subscribers to the Public Service Telephone Network (PSTN) 345.

In an Enhanced 911 system, the location of a mobile station 305 can be determined by embedding a GPS chip in the mobile station 305, or by measuring certain signaling characteristics between the mobile station 305 and the BTS 315. In either scenario, the process of locating a mobile station 305 with the degree of accuracy needed for the Enhanced 911 system is managed with a Mobile Positioning System (MPS) 335. The MPS 335 uses the same network resources that are used to manage and process calls, which makes its availability somewhat limited.

The Input Output Gateway (IOG) 350 processes call detail records (CDRs) to facilitate such actions as mobile subscriber billing. The IOG 350 receives call-related data from the MSC 325 and can interface with the Integrated Incident Information and Intelligence System 160.

In the exemplary embodiment of the present invention shown in FIG. 3, the Integrated Incident Information and Intelligence System 160 may receive data from a variety of locations in the wireless network. These locations include the BSC 320 and its interface, through the $A_{bis}$ Interface, with the BTS 315, MSC 325, the HLR 330, and the MPS 335.

The input communications processes monitor the wireless service provider's network elements and extract the relevant information from selected fields of selected records. The Integrated Incident Information and Intelligence System 160 can use data from any network element that contains at a minimum the mobile station identifier number, cell ID and a time stamp. Some of the more common data sources are discussed below.

CDRs may be requested from billing distribution centers or the distribution centers may autonomously send the records via file transfer protocol (FTP). Alternatively the CDRs may be extracted as they are routinely passed from the IOG 350 to a billing gateway, possibly utilizing a router that duplicates the packets. The specific method used will depend on the equipment and preferences of the wireless service provider.

Handover and Registration messages may be obtained by monitoring the proprietary or standard A-interface signaling between the MSC 325 and the BSCs 320 that it controls. The Integrated Incident Information and Intelligence System 160 may monitor that signaling directly or it may obtain signaling information from a signal monitoring system such as a protocol analyzer. In the latter case the signaling information may already be filtered to remove extraneous information. See the discussion in conjunction with FIG. 9, below, of the Privacy process for an exemplary embodiment of the present invention, which removes information that may identify the user of a specific mobile station 305. Alternatively, these messages may be extracted from a Base Station Manager that continuously monitors message streams on the BTS 315.

Figure 4:
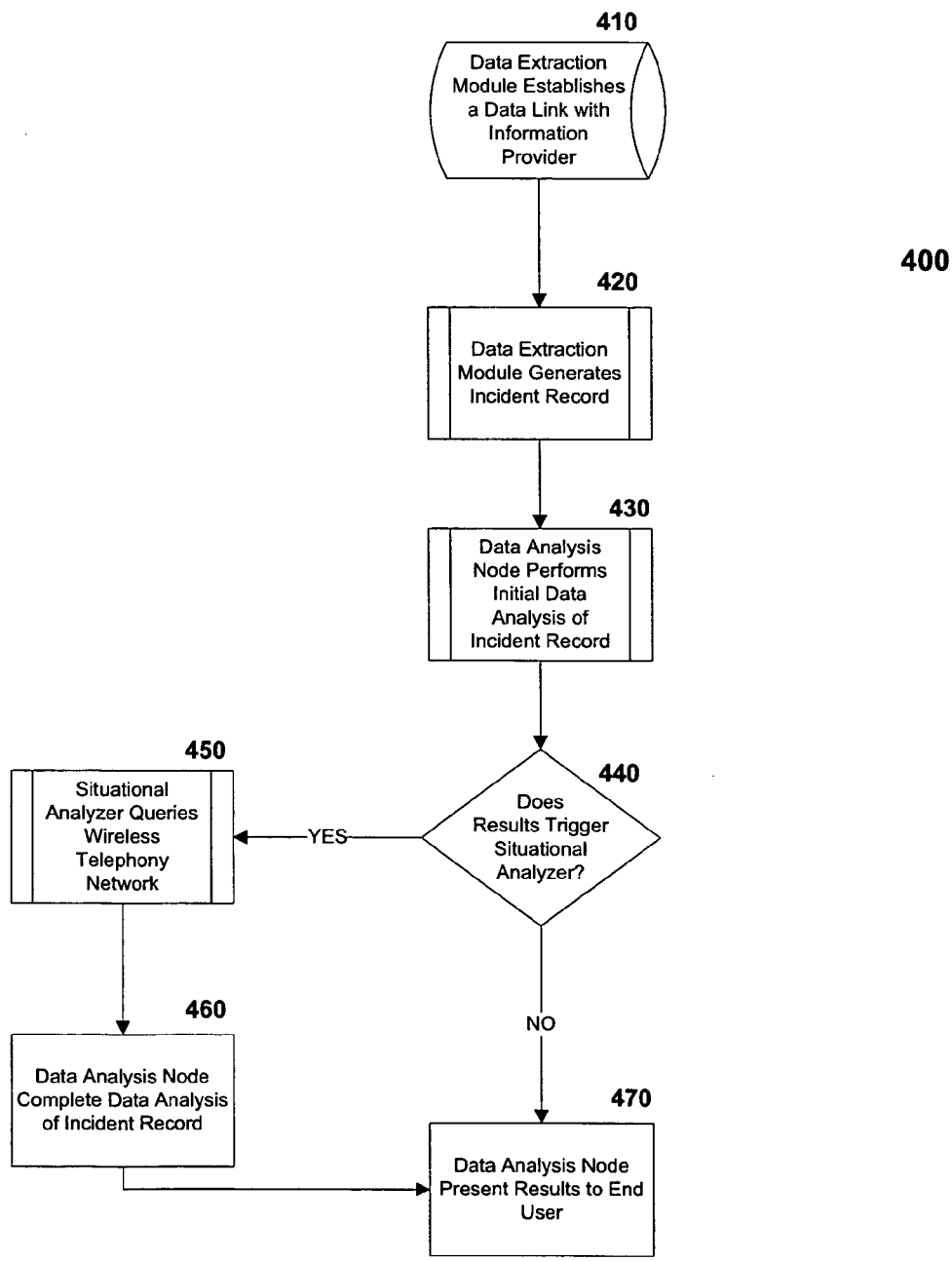
FIG. 4 presents an overall process flow diagram of an exemplary embodiment of the present invention.

FIG. 4 presents an overall process flow 400 of an exemplary embodiment of the present invention. Referring to FIGS. 1, 2a and 4, at step 410, a Data Extraction Module, such as Data Extraction Module 210, establishes a data link with one or more information sources, such as Telecommunications Networks 110, or one or more other information sources, such as a National Weather Service 120, News and Event Information 130, Government Agencies 140, and Data Sensors and Data Analysis Nodes 150. One skilled in the art would appreciate that this data link can be a continuous link constantly maintained between the Data Extraction Module 210 and the one or more information sources, a periodic link established on an as needed basis or a combination of both continuous and periodic connections.

At step 420, the Data Extraction Module 210 generates an Incident Record. This step is discussed in greater detail below, in conjunction with the discussion of FIG. 5. The Incident Record serves as the input to the Data Analysis Node 220.

At step 430, a Data Analysis Node, such as Data Analysis Node 220, performs an initial data analysis of the Incident Record. This step is discussed in greater detail below, in conjunction with the discussion of FIG. 6. At step 440, the Data Analysis Node 220 determines if the results of the initial data analysis triggers a Situational Analyzer, such as Situational Analyzer 230. For example, an initial characterization of an incident may determine that an accident has occurred at a certain location and that initial characterization may call for collecting traffic flow data from that location for a subsequent two hours.

If the result of this determination is "YES," then the process moves to step 450, where the Situational Analyzer 230 queries the wireless telephony network. This step is discussed in greater detail below, in conjunction with the discussion of FIG. 8. From step 450, the process 400 moves to step 460, where the Data Analysis Node completes the data analysis of the Incident Record. The result of this analysis is an Incident Detector Result, which reflects the characterization of the incident or incidents.

If the result of the determination at step 440 is "NO," or after step 460, then the process 400 moves to step 470, where the Data Analysis Node presents the results to one or more end users, such as End Users 170.

Figure 5:
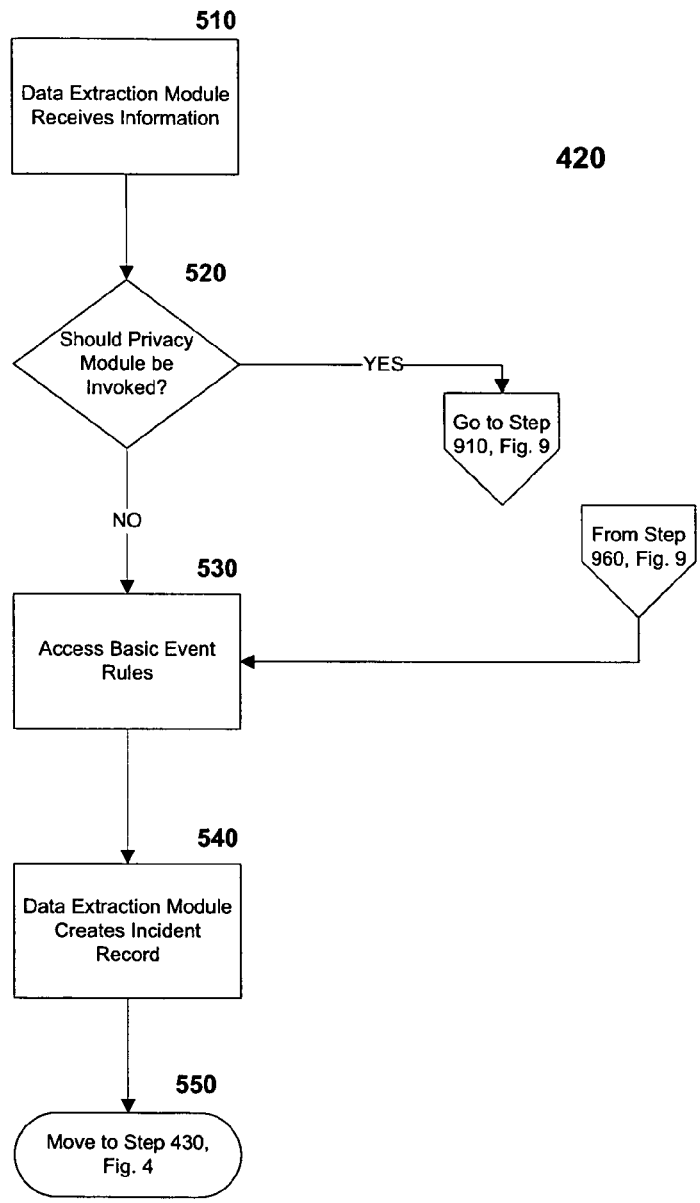
FIG. 5 presents a process flow diagram for generating an incident record as part of an exemplary embodiment of the present invention.

FIG. 5 presents a process flow diagram for the step of generating an incident record 420 as part of an exemplary embodiment of the present invention. Referring to FIGS. 2a, 4, and 5, at step 510, the Data Extraction Module 210 receives information from one or more information sources. This information may included mobile station information, such as call initiation (including 911 calls), call termination, handoffs from one cell to another, and mobile station registrations, or mobile station location. This information may also include 911 call initiation and call location from a wireline telephony network. Other information could be weather alerts, police activities, traffic sensor notifications, or new alerts.

At step 520, the Data Extraction Module 210 determines if a Privacy Module, such as Privacy Module 240, should be invoked. If the result of this determination is "YES," process 420 moves to Step 910, which is described below in conjunction with FIG. 9. To help ensure the privacy of wireless telephony network users, an exemplary embodiment may include the capability, through the Privacy Module, to mask any personal identifying information from the information received from the wireless telephony network and substitute a unique identifier for this information.

If the result of this determination is "NO," or after the Privacy Module complete its operations, process 420 moves to Step 530, where Basic Event Rules are accessed. The Basic Event Rules are used to identify certain events as incidents. These Basic Event Rules may simply include whether a 911 call was received, whether a news alert has been issued, or whether the received data indicates a traffic flow parameter. Based on applying these rules to the information received at step 510, the Data Extraction Module 210 creates an Incident Record. Once the record is generated, the process 420 moves to step 430 of process 400, as depicted in FIG. 4.

Figure 6:
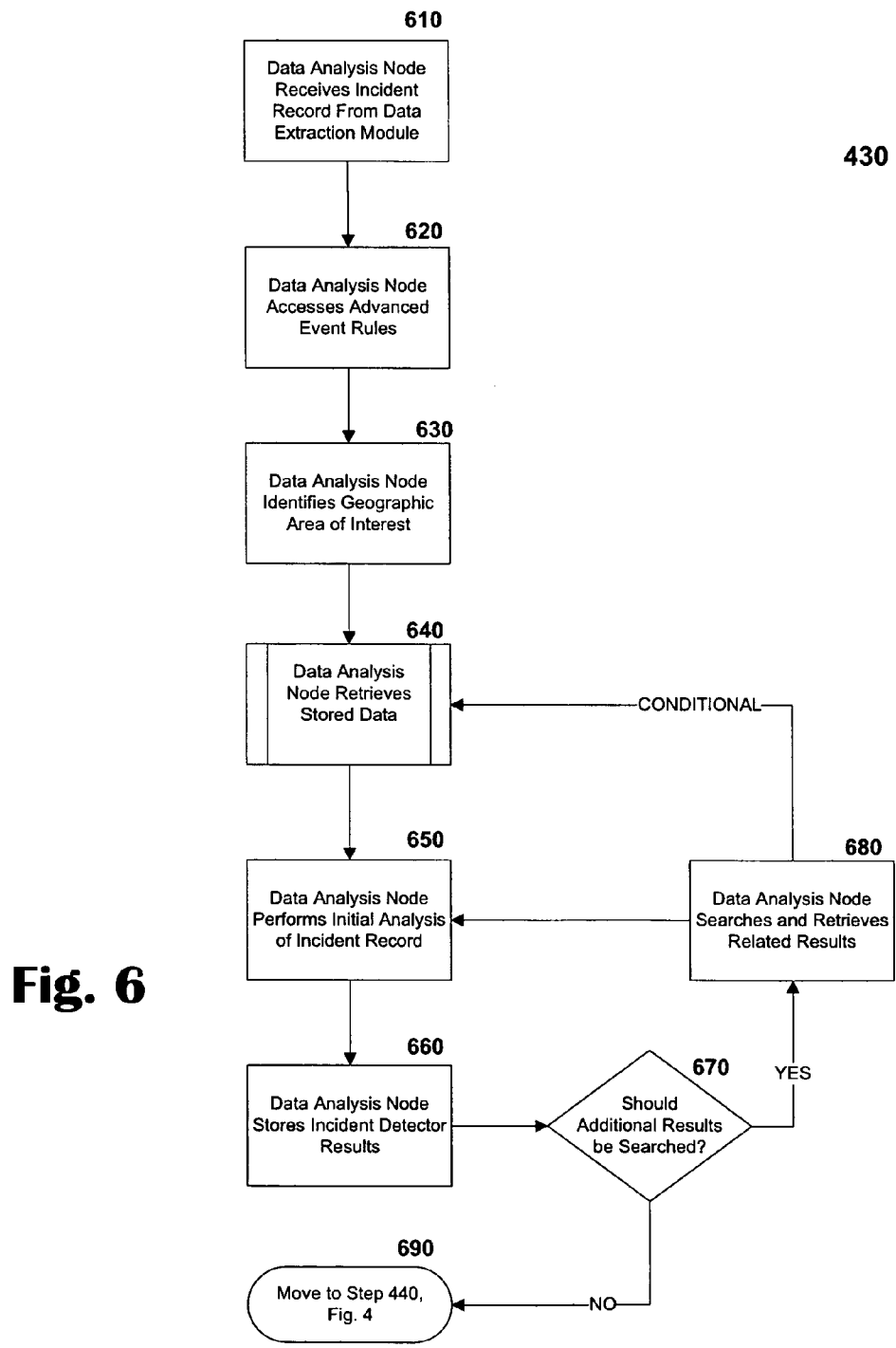
FIG. 6 presents a process flow diagram for performing an initial data analysis as part of an exemplary embodiment of the present invention.

FIG. 6 presents a process flow diagram for performing an initial data analysis as part of an exemplary embodiment of the present invention. Referring to FIGS. 2a, 4, and 6, at step 610, a Data Analysis Node, such as Data Analysis Node 220, receives the Incident Record from the data Extraction Module 210. At step 620, the Data Analysis Node 220 accesses Advanced Event Rules. These Advanced Event Rules are used to provide an initial characterization of the incident in the Incident Record. Some representative examples of Advanced Event Rules include:
  If traffic speeds drop by more than 50% and there are 3 or more 911 calls from moving vehicles then characterize the incident as an accident and continuously track all devices in the area for the next 2 hours;
  If 10 or more 911 calls are seen within a 15 minute period within a 3 mile radius, then continuously track all devices within a 25 mile radius for the next 4 hours;
  If system user designates a geographic area as a disaster area, then characterize that incident as a disaster declaration and continuously track all devices in the designated area for a user specified period of time;
  If multiple 911 calls are seen in adjacent PSAP areas, then characterize the incident an a multi-jurisdictional emergency and notify all involved PSAPs that there may be related incidents
  If the system receives notice of an Amber Alert, then characterize the incident as a child abduction and continuously track all devices in a 50 mile radius for the next 12 hours or during the entire time the Amber Alert is in effect;
  If severe weather is reported in a given area, then characterize the incident consistent with the type of weather alert and continuously track all devices for the duration of the severe weather warning; and
  If travel time through a work zone increases by more than 50% then characterize the incident as a traffic flow abnormality send a notification to the Department of Transportation or construction supervisor (allowing them to perhaps facilitate traffic movement through the area).

At step 630, the Data Analysis Node 220 identifies the geographic area of interest. At step 640, the Data Analysis Node 220 retrieves stored data. This step is discussed in greater detail below, in conjunction with FIG. 8. Generally, historical data; dynamic data, such as traffic data, weather data, construction data, calendar data, sensor data, and other similar dynamic data; and static data, such as geographic information system (GIS) data, is retrieved at step 630. This information is combined with advanced event rules to characterize an incident.

At step 650, the Data Analysis Node 220 performs an initial analysis of the Incident Record. As one representative example, the Incident Record, which may have originally been based on information from a traffic data sensor, indicates that the speed of traffic at a specific section of an interstate highway has dropped from 60 miles per hour to 10 miles per hour. The data retrieval step, step 640, indicates that, at that specific geographic location there is no construction. Historical data indicates that at that time and day, traffic should be moving 60 mph. Weather information indicates that there is no inclement weather. Calendar event information does not indicate any events that would impact traffic at that location. As a result of applying the Advanced Event Rules to these data, the Data Analysis Node may initially characterize the incident as a traffic accident.

At step 660, the Data Analysis Node 220 stores the incident analysis as an Incident Detector Result. Information that may be stored includes a case number, the type of Incident Record, the preliminary categorization of the incident, a time stamp, and a location. Other information that may be stored if the incident record is based on information about a mobile station includes an anonymous identifier for the mobile station, an indication of whether the mobile station is moving, and if so, the road segment location and direction and speed of movement.

At step 670, the Data Analysis Node 220 determines if the characterization of the incident determined at step 650 requires a further analysis of other, possibly related, Incident Records. If the results of this determination is "YES," the process 430 moves to step 680 where it searches the stored Incident Detector Results for other incidents at nearby locations and at the same time. Expanding on the example discussed above in conjunction with step 650, the Data Analysis Node 220 would search the stored records to determine of other incidents occurred near that highway segment near the same time as the incident that recorded the slow-down of traffic speed. This search may find additional Incident Detector Results, such as 911 calls made from mobile stations at that location and time.

After the additional Incident Detector Results are retrieved, the process 430 returns to step 650 for further analysis. The results of this further analysis may be a new grouping of multiple incidents into a single Incident Detector Result. To continue with the example, a new case number may be associated with the traffic slow-down incident and one or more 911 calls. The analysis may conclude that a traffic accident has occurred at that highway location.

In some cases, the Data Analysis Node 220 may not be able to characterize the Incident Record until other Incident Records are evaluated or subsequent information is obtained.

If the results of the determination at step 670 is "NO," the process 430 moves to step 690, where it returns to step 440 of process 400.

Figure 7:
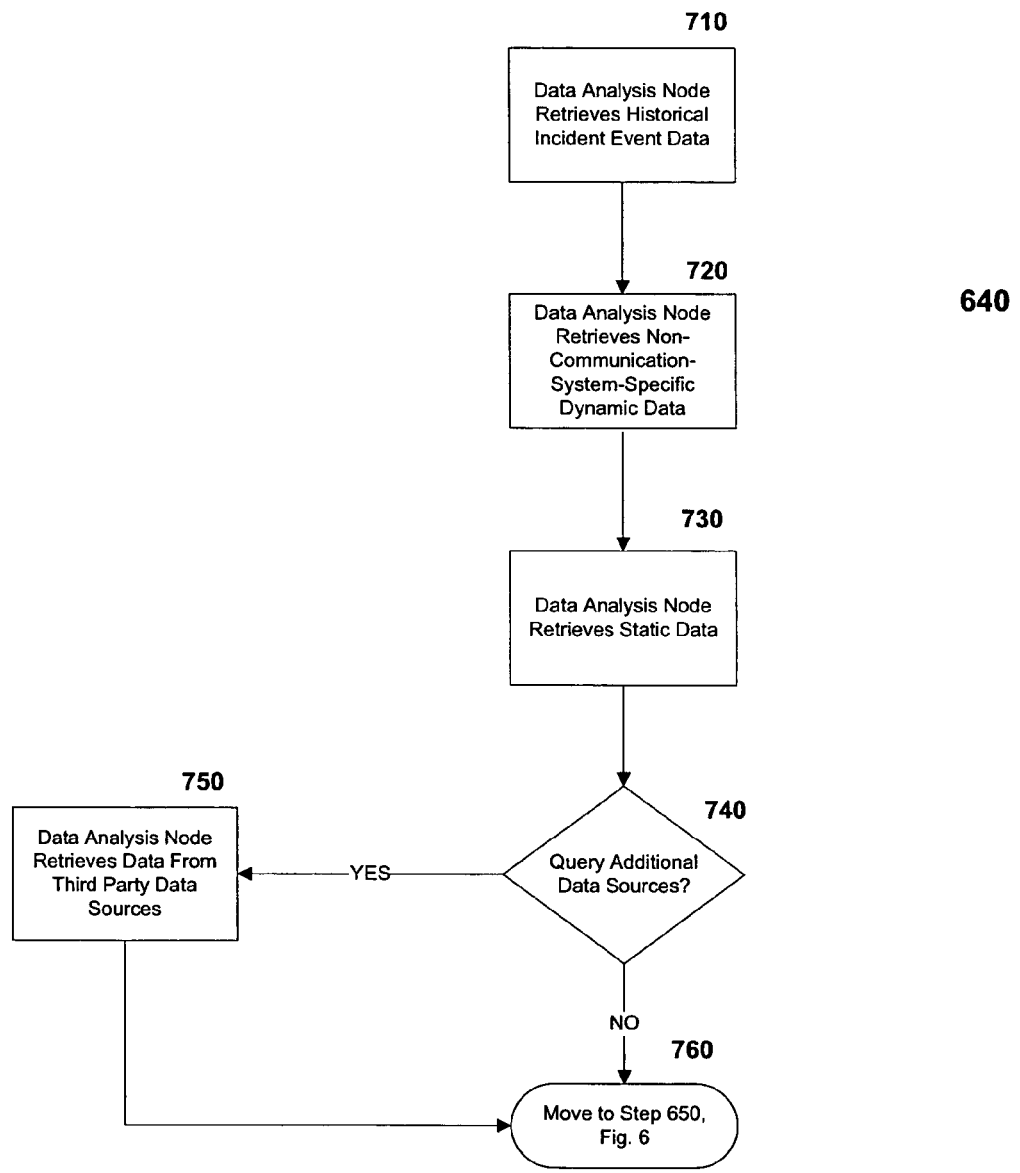
FIG. 7 presents a process flow diagram for accessing stored data as part of an exemplary embodiment of the present invention.

FIG. 7 presents a process flow diagram for accessing stored data as part of an exemplary embodiment of the present invention. Referring to FIGS. 2a, 6, and 7, at step 710, the Data Analysis Node 220 retrieves historical incident data.

These data may be previously-stored Incident Detector Results. Additionally, these data may include historical summaries. For example, these summaries may provide general trend information such as traffic speeds for certain days and times or annual events.

At step 720, the Data Analysis Node 220 retrieves dynamic data not associated with a wireless telephony network. That is, these data would not include movement information for mobile stations. These data may include weather information, news information, calendar event information (school schedules, sporting events, festivals, conventions, etc.), sensor information, road construction plans, and governmental agency alerts.

At step 730, the Data Analysis Node 220 retrieves static data. These data may include information from a geographic information system and may include the locations of event venues, roadways, and companies with large numbers of employees.

At step 740, the Data Analysis Node 220 determines if other data sources should be queried. These other data sources may include other Data Extraction Modules or third-party sources such as private employers. If the result of this determination is "YES," then the process 640 moves to step 750 and the Data Analysis Node 220 retrieves the additional data. If the result of this determination is "NO," or after the additional data is retrieved, the process 640 moves to step 760, where it returns to process 430 at step 650.

Figure 8:
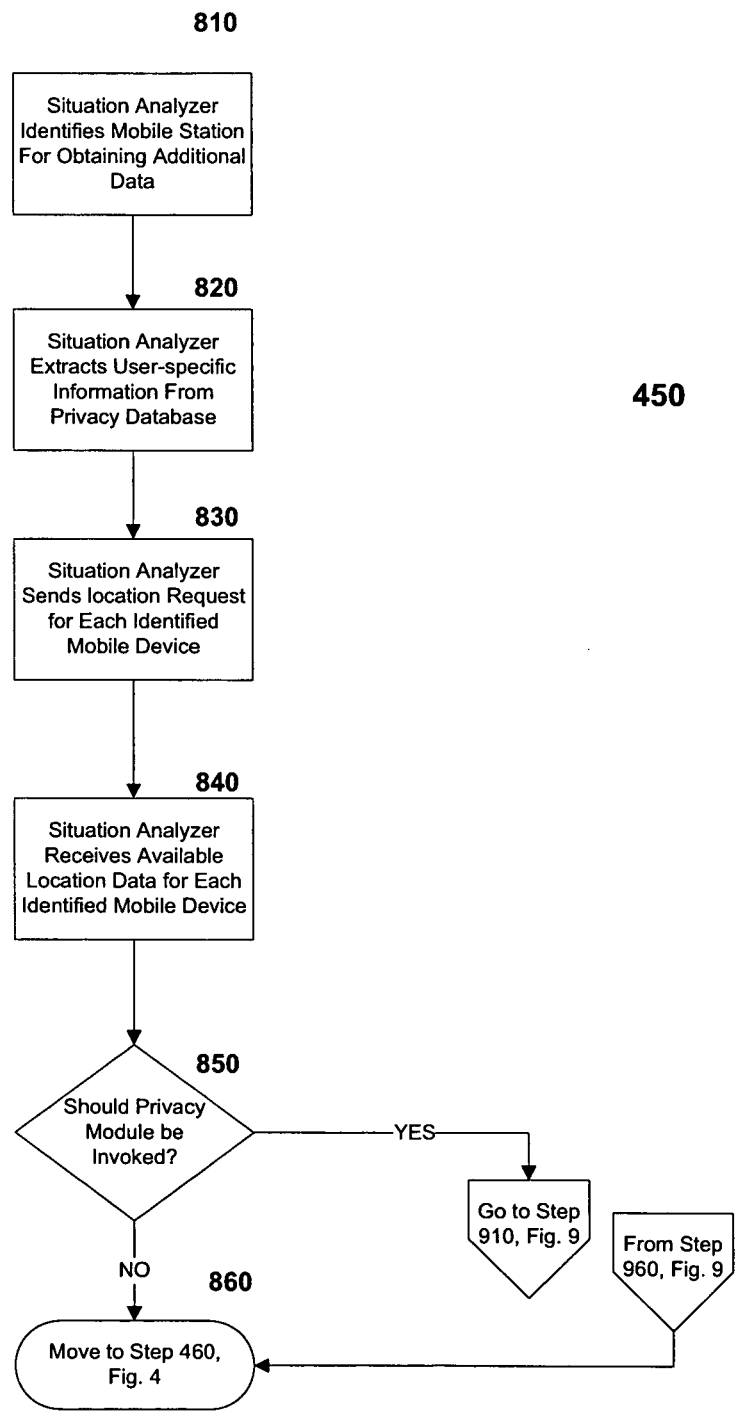
FIG. 8 presents a process flow diagram for querying a wireless telephony network as part of an exemplary embodiment of the present invention.

FIG. 8 presents a process flow diagram for querying a wireless telephony network as part of an exemplary embodiment of the present invention. Referring to FIGS. 2a, 4, and 8, at step 810, a Situation Analyzer 230 identifies mobile station for obtaining additional information. For example, the results of step 430 may indicate that a mobile station on a road segment has stopped. The Situation Analyzer 230 will determine other mobile stations near that location moving in the same direction as the mobile station that appears to be stopped. This information may be stored as Incident Detector Results or stored independently as traffic data.

At step 820, the Situation Analyzer 230 contacts the Privacy Module 240 and extracts user-specific information about the identified mobile stations. At step 830, the Situation Analyzer 230 sends a request to the wireless telephony network for the location, as determined by the network's mobile positioning system, of each mobile station identified in step 810.

At step 840, the Situation Analyzer 230 receives the location data from the network's MPS. At step 850, The Situation Analyzer 230 determines if the Privacy Module 240 should be invoked to mask any personal identifying information. If the result of this determination is "YES," process 450 moves to Step 910, which is described below in conjunction with FIG. 9. If the result of this determination is "NO," or after the Privacy Module complete its operations, process 450 moves to Step 860, where it returns to process 400 at step 460.

Figure 9:
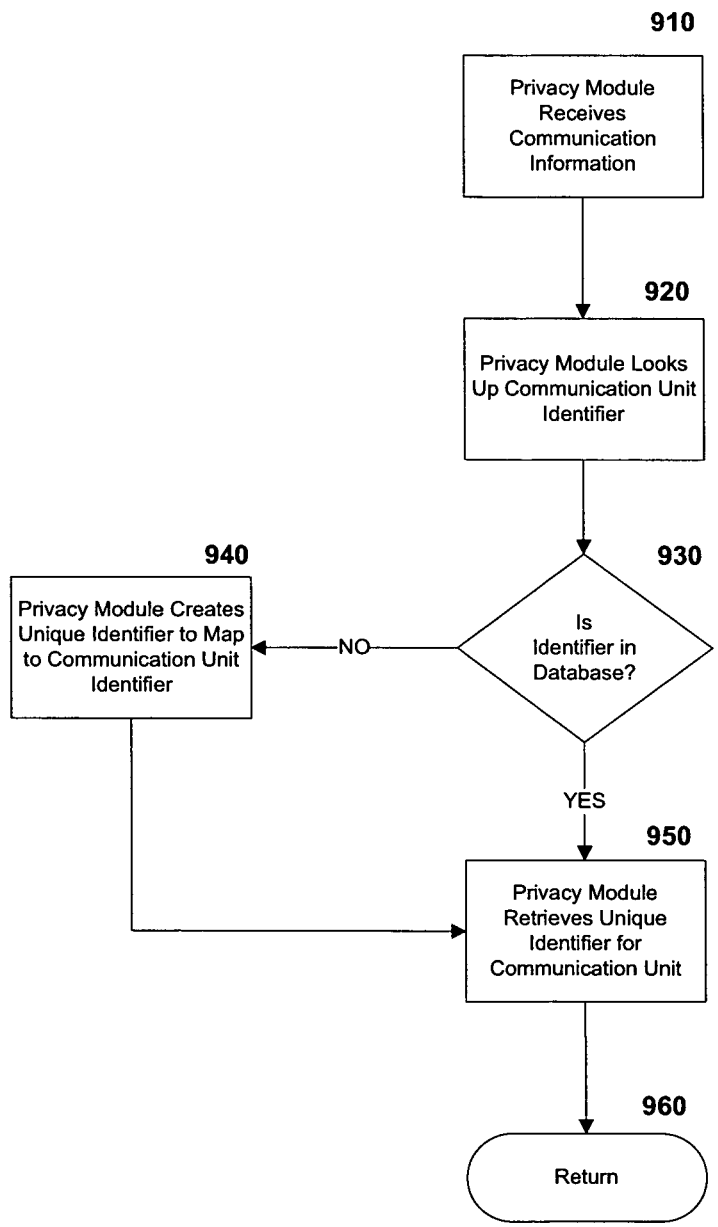
FIG. 9 presents a process flow diagram for a Privacy Module of an exemplary embodiment of the present invention.

FIG. 9 presents a process flow diagram for a Privacy Module of an exemplary embodiment of the present invention. Referring to FIG. 9, at step 910, the Privacy Module 240 receives communication information. At step 920, the Privacy Module 240 looks up a Communication Unit Identifier associated with the communications information in a database. This Identifier may be the serial number or phone number of a mobile station. The database includes all Communication Unit Identifiers processed by the Privacy Module 240. This database may be purged periodically, such as when a record is more than 24 hours old, to provide an extra measure of privacy.

Alternatively, this database may be maintained for long periods of time. Historical anonymous movement analysis could be very useful in investigative activities, especially when the investigation involves serial offenses. For example, if a similar crime occurs in several different locations, the movement data maintained in the Incident Detector Results database, or other traffic-information-specific database, could be analyzed to determine if any mobile devices were present at a statistically significant number of these locations at the times the crimes were committed. Another example of how anonymous movement data could be useful for law enforcement officials is when the anonymous movement is overlaid with the movement of a known suspected terrorist or criminal. If there is a statistically significant correlation between an anonymous mover and the known suspect, then that may be sufficient reason to suspect that there is collaboration between the two.

If there is sufficient evidence to suggest that the anonymous mobile device may belong to a suspect such as in one of the examples above, then law enforcement agencies could obtain proper authorization to unveil the identity of the owner of the device. In that case, the Privacy Module 240 database could be accessed to unmask the anonymous mobile station. Even without the identity, the device could be flagged to monitor and alert authorities if there is any further suspicious movement. This type of application may justify maintaining the Privacy Module 240 database.

At step 930, the Privacy Module 240 determines if the Communication Unit Identifier is in the database. If the result of this determination is "NO," then the Privacy Module 240 creates, at step 940, a unique identifier to map to the Communication Unit Identifier and both identifiers are stored in Privacy Module 240 database. This unique identifier could be a serial number, the results of an encryption algorithm, or other process for mapping a unique identifier with the Communication Unit Identifier. If the result of this determination is "YES," or after step 940 is complete, the Privacy Module 240 retrieves, at step 950, the unique identifier for the communications unit. The further processing of the information uses the unique identifier rather than the personal identifying information. The Privacy Module 240 then moves to step 960, where it returns to the process that invoked the Privacy Module 240.

In some cases, the information source may apply it own processes to mask personal identifying information. For example, a wireless telephony network may mask personal identifying information prior to conveying the information to the Data Extraction Module 210, such as by having a system that strips this information behind the network's firewall. Alternatively, the data source could contract with a separate data aggregator that supplies the information to the Data Extraction Module 210, after personal identifying information was removed.

In view of the foregoing, one would appreciate that the present invention supports a system and method for identifying, characterizing, and reporting incidents. The system and method can receive information from telecommunications networks or other information providers that may trigger generating an Incident Record. The Incident Record may further be analyzed to characterize the type of incident. This further analysis may include retrieving data from multiple data sources to support the application of rules used to characterize the incident. Additionally, analyses from multiple incidents may be combined if determined to relate to a single event.

What is claimed is:

1. A method running on a computer comprising the steps of:
   receiving, at the computer, an incident record;
   accessing, by the computer, a plurality of basic event rules and advanced event rules;
   identifying, by the computer, a geographic area of interest;
   retrieving, by the computer, stored data comprising historical incident event data, dynamic data, and static data;
   analyzing, by the computer, the incident record by applying the basic event rules and advanced event rules to the incident record, wherein applying the basic event rules and advanced event rules comprise comparing the historical incident event data to at least one of the dynamic data and static data; and
   providing a result of the applying the basic event rules and advanced event rules to the incident record.

2. The method of claim 1 wherein the step of retrieving, by the computer, stored data further comprises retrieving data from third party sources.

3. The method of claim 1 further comprising the step of storing, by the computer, the results of analyzing the incident record as historical incident even data.

4. The method of claim 1 wherein the dynamic data comprises data from data sensors.

5. The method of claim 1 wherein the dynamic data comprises data from a first data source comprising a wireless telecommunications network and a second data source comprising a source other than a wireless telecommunications network.

6. The method of claim 5 wherein the second data source comprising a source other than a wireless telecommunications network comprises one of a weather information source, a news information source, or a calendar event information source.

7. The method of claim 1 further comprising the step of applying a situation analyzer to obtain additional data from one or more mobile stations prior to performing the step of providing a result.

8. The method of claim 7 wherein the step of applying a situation analyzer to obtain additional data from one or more mobile stations comprise the steps of:
   identifying one or more mobile stations for obtaining additional data; and
   receiving available location data for each identified mobile station.

9. The method of claim 8 wherein the step of receiving available location data for each identified mobile station is in response to sending a location request to each identified mobile station.

10. The method of claim 8 further comprising the step of extracting user-specific information from a privacy database.

* * * * *